C. F. MITCHELL, J. L. BARKER & J. WHITTAKER.
CLOTH CUTTING MACHINE.
APPLICATION FILED SEPT. 19, 1912.

1,066,304.

Patented July 1, 1913.

6 SHEETS—SHEET 1.

WITNESSES.

INVENTORS.

C. F. MITCHELL, J. L. BARKER & J. WHITTAKER.
CLOTH CUTTING MACHINE.
APPLICATION FILED SEPT. 19, 1912.
1,066,304.
Patented July 1, 1913.
6 SHEETS—SHEET 3.
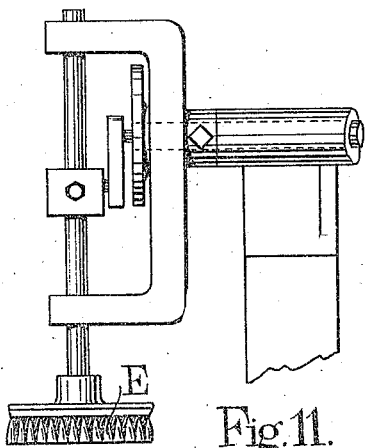
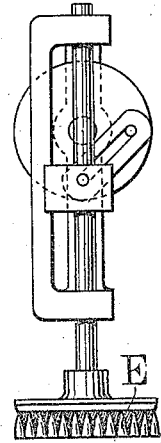
Fig. 11.
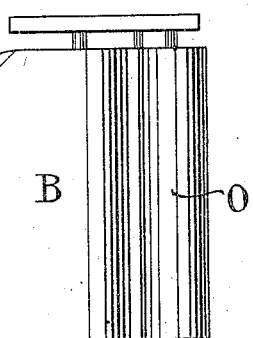
Fig. 3.
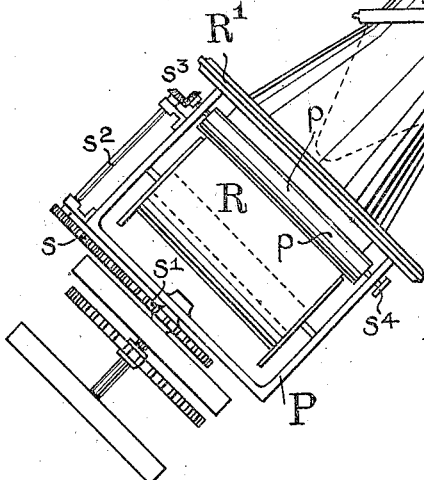
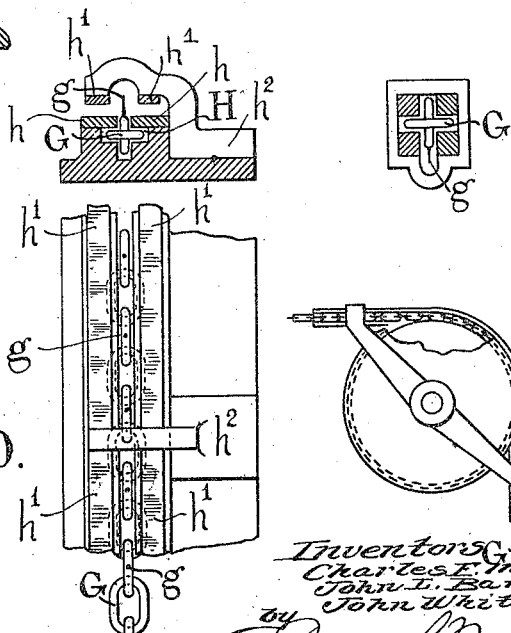
Fig. 10.
WITNESSES
Edward S. White
Inventors
Charles F. Mitchell
John L. Barker
John Whittaker
by
Anna L. Norris

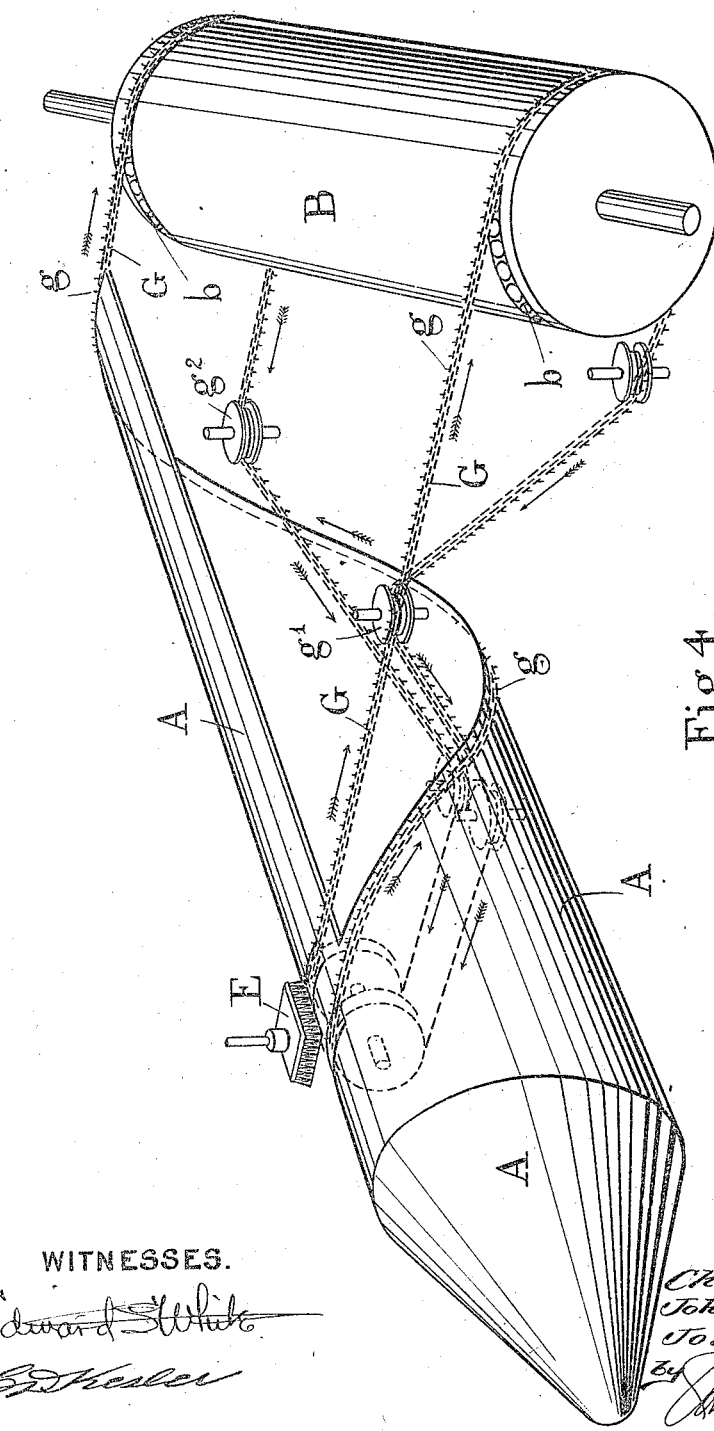

C. F. MITCHELL, J. L. BARKER & J. WHITTAKER.
CLOTH CUTTING MACHINE.
APPLICATION FILED SEPT. 19, 1912.

1,066,304.

Patented July 1, 1913.
6 SHEETS—SHEET 5.

WITNESSES.

INVENTORS.
Charles F. Mitchell
John L. Barker
John Whittaker

C. F. MITCHELL, J. L. BARKER & J. WHITTAKER.
CLOTH CUTTING MACHINE.
APPLICATION FILED SEPT. 19, 1912.

1,066,304.

Patented July 1, 1913.

6 SHEETS—SHEET 6.

WITNESSES
Edward S. White

INVENTORS
Charles F. Mitchell
John L. Barker
John Whittaker

UNITED STATES PATENT OFFICE.

CHARLES F. MITCHELL, OF MANCHESTER, JOHN L. BARKER, OF BLACKLEY, AND JOHN WHITTAKER, OF CHEADLE HULME, ENGLAND.

CLOTH-CUTTING MACHINE.

1,066,304. Specification of Letters Patent. Patented July 1, 1913.

Application filed September 19, 1912. Serial No. 721,265.

*To all whom it may concern:*

Be it known that we, CHARLES FREDERICK MITCHELL, JOHN LORD BARKER, and JOHN WHITTAKER, British subjects, CHARLES FREDERICK MITCHELL residing at Levenshulme, Manchester, county of Lancaster, England, JOHN LORD BARKER residing at Blackley, county of Lancaster, England, and JOHN WHITTAKER residing at Cheadle Hulme, county of Ghester, England, have invented certain new and useful Improvements in Cloth-Cutting Machines, of which the following is a specification.

This invention relates to apparatus for manufacturing or producing cloth upon the bias in long lengths such as described in the specification of U. S. Patent No. 905207.

It comprises certain details of construction to render the machine more efficient in working.

It will be fully described with reference to the accompanying drawings forming part of the specification.

Figure 1:
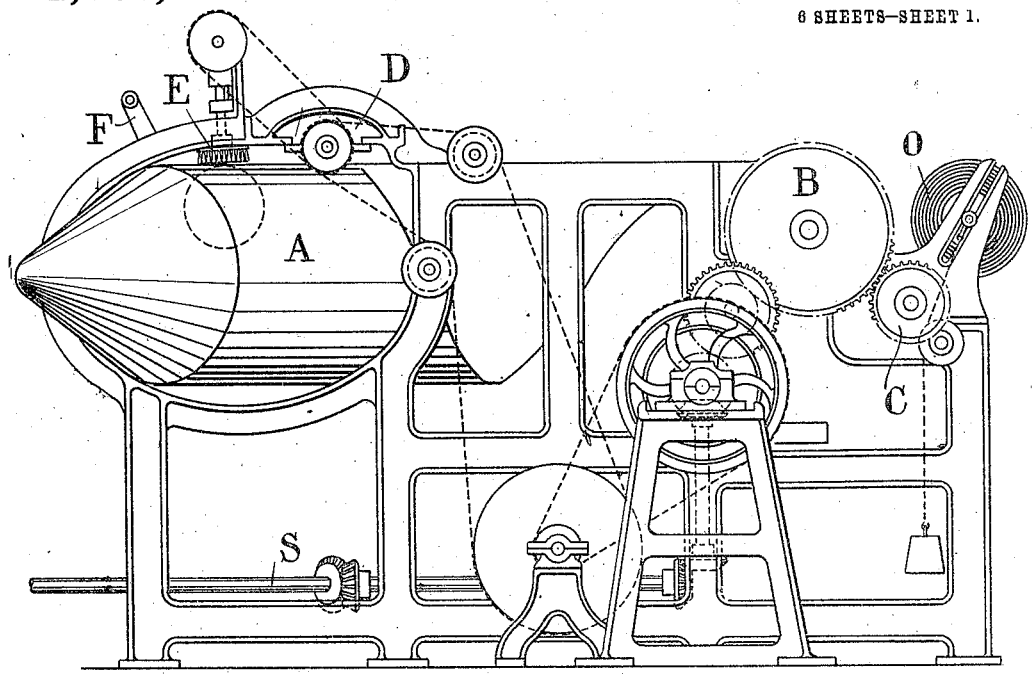
Figure 5:
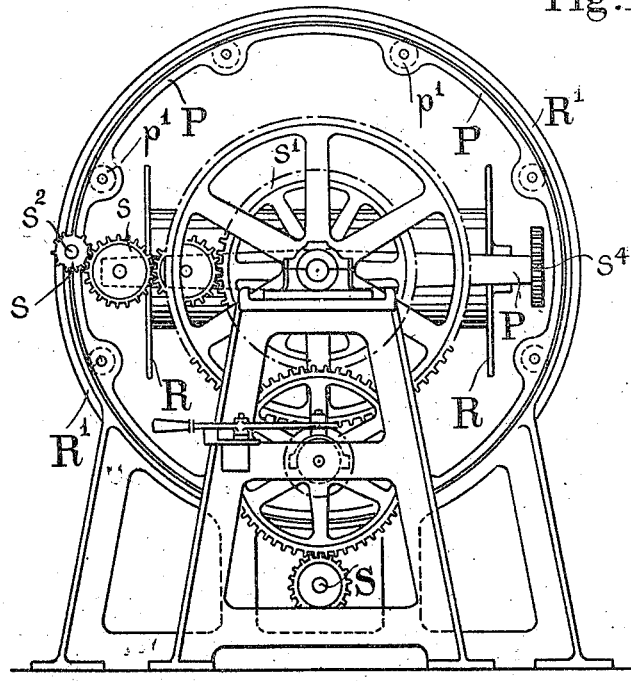
Figure 2:
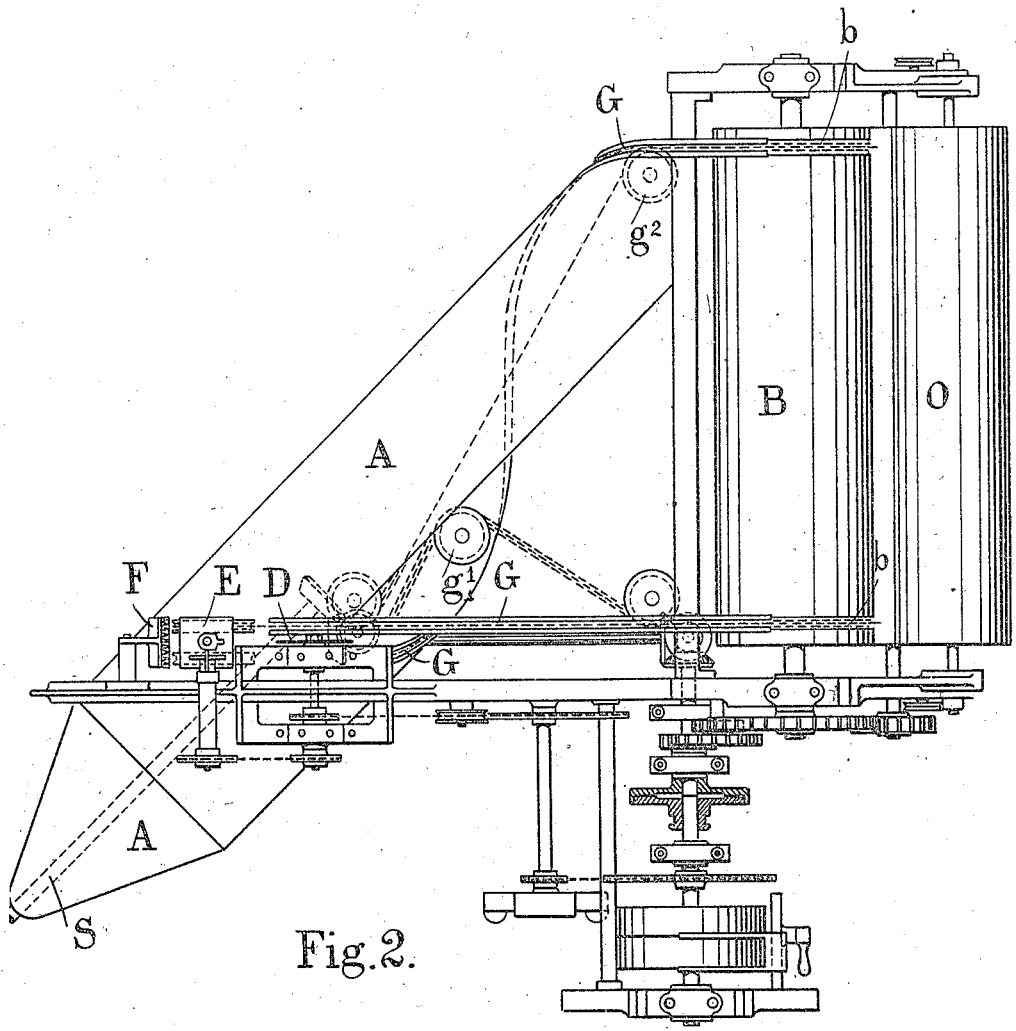
Figure 7:
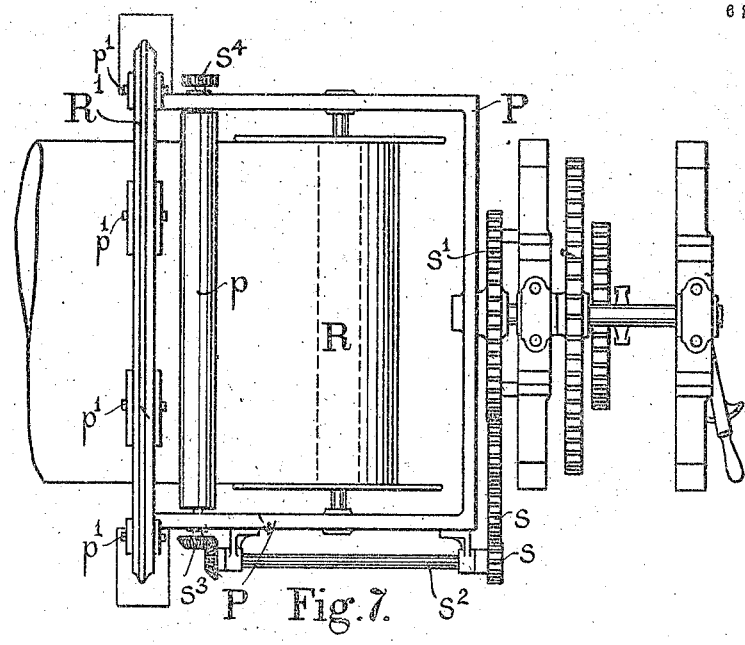
Figure 6:
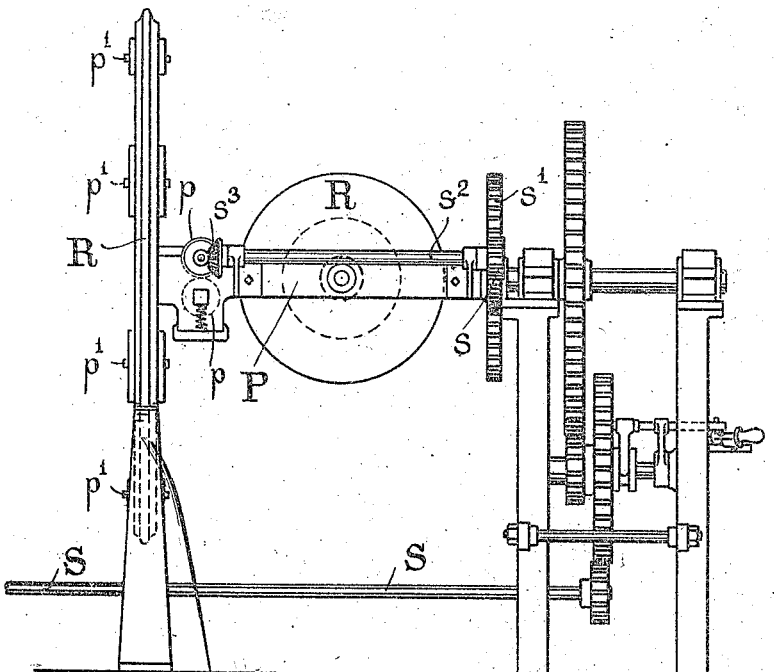
Figure 8:
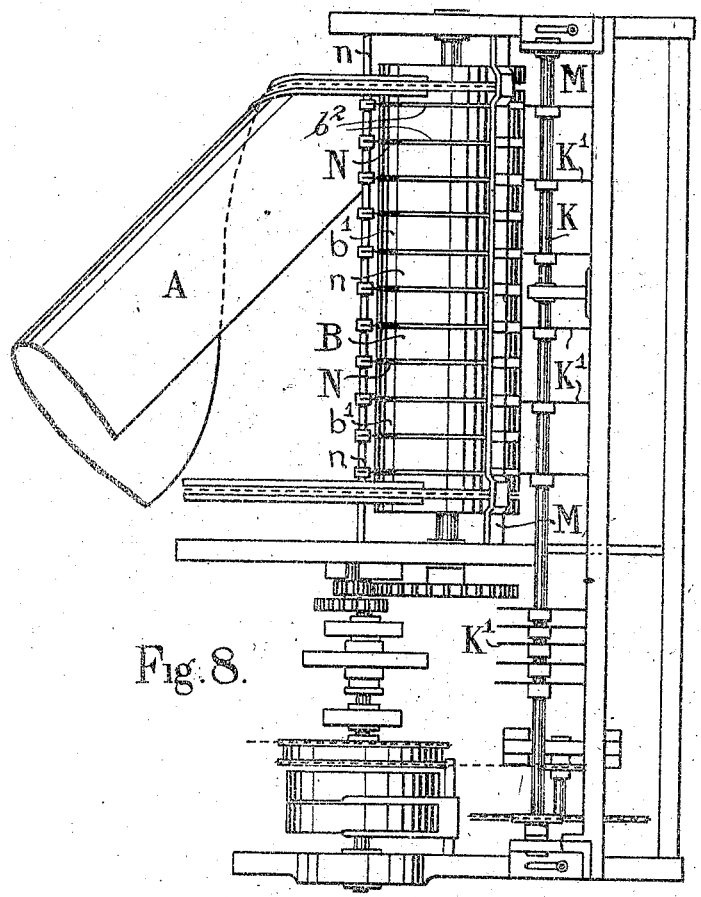
Figure 9:
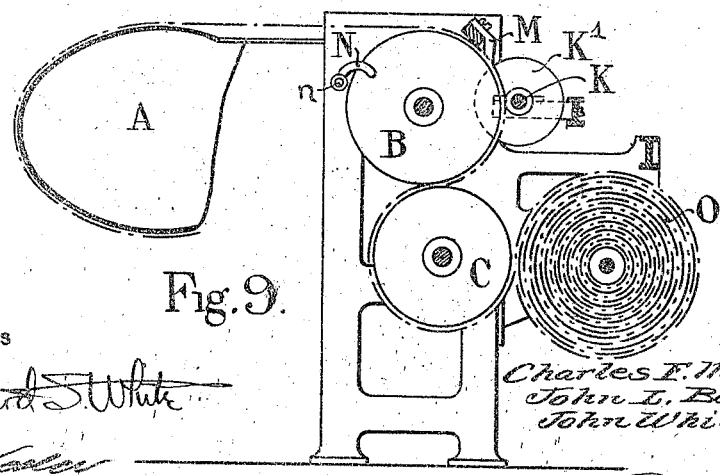

Figure 1. is a side elevation. Fig. 2. is a plan. Fig. 3 is a plan (drawn to smaller scale) showing the position of the cloth delivery apparatus and the cloth passing through the machine. Fig. 4. is a perspective diagram of the receiving drum and the endless inextensible carrier for drawing the cloth through the machine. Fig. 5. is an end elevation of the cloth delivery apparatus. Fig. 6. is a side elevation of same. Fig. 7. is a plan of same. Fig. 8. is a plan of the drawing off end of the machine showing a modification for cutting the cloth into strips. Fig. 9. is a sectional side elevation of same. Fig. 10. are details of the chain and chain guides. Fig. 11. are details of dabbing brush to lay the cloth onto the pins of the endless inextensible carrier.

The cylinder or drum A, the drawing off rollers B and C and the rotary knife D are similar to those described in the prior Patent No. 905207. Instead of two chains or bands one for either edge of the cloth as previously specified we employ a single endless spiked inextensible carrier such as an endless chain, or inextensible band G so arranged that the pins or spikes $g$ thereon project above the surface of the cylinder A at both sides of the rotary knife D to engage the cloth as it is drawn on to the cylinder and the chain G in its traverse passes around both ends of the drawing off roller B. The pins $g$ of the chain G hold the cloth as it is being cut by the knife B and retain a hold or grip of the two severed edges and draw the cloth over the roller B without stretching or pulling the edges of the cloth longitudinally. A chain groove is formed spirally around the cylinder A to carry the chain with the pins projecting therefrom and guide rollers $g'$ and $g^2$ are mounted therein to carry the chain on its return or backward traverse. The form of chain we prefer is of cable pattern in which the links will lie alternately vertical and horizontal (see Fig. 10) and to the outer edges of alternate links, those which are vertical, the pins $g$ are affixed. The links of the chain G traverse a cross shaped guide groove H with top bars $h$ and through a slit formed by these bars the pins project. A groove is formed above the chain groove by suspended bars $h'$, into which the pins $g$ project, to receive the severed edges of the cloth to prevent it rising off the pins $g$ as it travels through the machine.

Behind or at the bottom of the chain groove a series of antifriction or carrier rollers may if desired be mounted in the interior of the cylinder A for the chain to run upon to reduce the friction. Such rollers may be carried in a frame of light spiral castings or between two angle bars twisted spirally.

The under portion of the cylinder A is preferably cut away where the spiral chain groove is placed and does not extend beyond the edge of the guide groove or the frame carrying it. The machine is thus made more compact by permitting the taking off roller B to be placed much closer to the cylinder A. Sprockets or teeth $b$ are placed at the ends of the drawing off roller B to drive the chain G.

In front of the cutting knife D a dabbing brush or pad E is mounted which works with a quick reciprocating motion to lay the cloth firmly onto the pins of the chain, and another brush, pad or plate F is mounted in front of the dabbing brush E and held pressed against the cloth by a spring or screw to smooth any creases or wrinkles out of the cloth as it is drawn forward to the cutting knife.

Instead of an endless chain arranged to engage both edges of the severed cloth the endless chain may be so arranged as to engage the severed cloth at or near its center and pass around the center of the drawing off roller B or such a chain may be employed in addition to the chain G engaging the edges.

The machine is made in two types, one of which cuts the cloth into a single wide piece only as in Figs. 1 and 2. The second type is furnished with additional cutters K' at the drawing off end of the machine for dividing the cloth into a number of narrow strips. In this case the drawing off roller B is built up of a series of narrow drums $b'$ with slits $b^2$ between them, or the roller B is formed with a series of circumferential slits $b^2$ (see Figs. 8 and 9) and a small bar M mounted in adjustable bearings is placed in front of the drawing off roller B to lay the cloth thereon and hold it when being cut into strips. A number of revolving knives or cutters K' are adjustably mounted in front of or below the bar M and rotate in the slits $b^2$ of the roller B. The shaft K which carries the additional cutters K' may be made longer than the width of the roller so that spare knives K' may be carried at the ends, thus making it unnecessary to take the shaft out of its bearings when the number of knives has to be increased or reduced. At the back of the roller B a shaft $n$ is mounted carrying hooks or fingers N to enter the slits $b^2$ to keep them clear of fluff occasioned by the cutting.

The beam or roller O upon which the cloth is wound is journaled in slots at the front of the machine and is driven by frictional contact with the lower drawing-off roller C and is held in contact therewith by weighted levers, or other suitable means.

The delivery mechanism by which the tubular cloth is delivered to cutting apparatus (see Figs. 3, 5, 6 and 7) is constructed with a rotary frame P to carry the cloth beam R and delivery rollers $p$. The front of the frame P is of annular form fitted with rollers $p'$ and is supported in a fixed annular cradle R'. The frame P is rotated by suitable gearing from a shaft S (or by a chain) from the main driving mechanism of the machine so that the speed of delivery can be adjusted to the take up of the machine and the delivery rollers $p$ are driven by pinions $s$ revolving around a stationary wheel $s'$ through the shaft $s^2$ and bevels $s^3$ the two rollers $p$ being geared together by pinions $s^4$.

What we claim as our invention and desire to protect by Letters Patent is:—

1. In apparatus for cutting tubular cloth spirally to produce long lengths or strips of cloth upon the bias having a stationary cylinder set obliquely to drawing off rollers the combination therewith of a single endless spiked inextensible carrier to engage the cloth and carry it forward over the taking off rollers substantially as described.

2. In apparatus for cutting tubular cloth spirally to produce long lengths or strips of cloth upon the bias having a stationary cylinder set obliquely to drawing off rollers the combination therewith of a single endless spiked inextensible carrier so placed and arranged as to engage both edges of the cloth as it is severed and carry them forward over the taking off roller substantially as described.

3. In apparatus for cutting tubular cloth spirally to produce long lengths or strips of cloth upon the bias having a stationary cylinder set obliquely to drawing off rollers the combination therewith of a chain having alternate horizontal and vertical links with pins on the vertical links and a guide having a cross-shaped groove in which the chain works substantially as described.

4. In apparatus for cutting tubular cloth spirally to produce long lengths or strips of cloth upon the bias having a stationary cylinder set obliquely to drawing off rollers the combination with the spiked chain and chain guide of a bar to prevent the cloth leaving the pins.

5. In apparatus for cutting tubular cloth spirally to produce long lengths or strips of cloth upon the bias having a stationary cylinder set obliquely to drawing off rollers the combination with the spiked chain and chain guide of a superimposed groove to prevent the cloth leaving the pins.

6. In apparatus for cutting tubular cloth spirally to produce long lengths or strips of cloth upon the bias having a stationary cylinder set obliquely to drawing off rollers and an endless spiked inextensible carrier the combination therewith of a dabbing mechanism to lay the cloth onto the spikes of the carrier and means to smooth the creases out of the cloth before being cut substantially as described.

7. In apparatus for cutting tubular cloth spirally to produce long lengths or strips of cloth upon the bias having a stationary cylinder set obliquely to drawing off rollers, the combination therewith of a take off roller provided with annular slits and rotary cutters for dividing the bias cloth into strips substantially as described.

8. In an apparatus for cutting tubular cloth spirally to produce long lengths or strips of cloth upon the bias, a stationary cylinder, drawing off rollers set obliquely to the cylinder, a spiked carrier working in relation to the cylinder and the drawing off rollers, and a dabbing mechanism to lay the cloth upon the spikes of the carrier.

In testimony whereof we have hereunto set our hands in presence of two subscribing witnesses.

CHARLES F. MITCHELL.
JOHN L. BARKER.
JOHN WHITTAKER.

Witnesses:
J. OWDEN O'BRIEN,
GEO. H. O'BRIEN.